United States Patent
Li

(10) Patent No.: US 11,572,308 B2
(45) Date of Patent: Feb. 7, 2023

(54) ANTI-BLAST CONCRETE AND METHOD OF FABRICATING ANTI-BLAST STRUCTURE MEMBER USING SUCH ANTI-BLAST CONCRETE

(71) Applicant: National Taipei University of Technology, Taipei (TW)

(72) Inventor: Yeou-Fong Li, New Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days.

(21) Appl. No.: 17/061,204

(22) Filed: Oct. 1, 2020

(65) Prior Publication Data

US 2021/0371336 A1    Dec. 2, 2021

(30) Foreign Application Priority Data

Jun. 2, 2020   (TW) .................................. 109118452

(51) Int. Cl.
   *C04B 14/38*        (2006.01)
   *C04B 16/06*        (2006.01)
   (Continued)

(52) U.S. Cl.
   CPC ........ *C04B 16/0691* (2013.01); *C04B 14/386* (2013.01); *C04B 20/006* (2013.01);
   (Continued)

(58) Field of Classification Search
   CPC . C04B 16/0691; C04B 14/386; C04B 20/006; C04B 40/0042; C04B 40/0046;
   (Continued)

(56) References Cited

U.S. PATENT DOCUMENTS 5,685,902 A * 11/1997 Tezuka .................... C04B 28/02
                                                     428/408
6,723,162 B1 *  4/2004 Cheyrezy ............... C04B 16/06
                                                     106/644

(Continued)

FOREIGN PATENT DOCUMENTS

CN           1472157 A  *  2/2004  ............. C04B 14/02
CN         105859217 A  *  8/2016
JP        2010116274 A  *  5/2010  ............. C04B 28/02

OTHER PUBLICATIONS

CN-105859217-A, Wang et al machine translation (Year: 2016).*
JP-2010116274-A, Dei et al machine translation (Year: 2010).*
CN-1472157-A, Wu et al., machine translation (Year: 2011).*

*Primary Examiner* — Kevin E Yoon
*Assistant Examiner* — Marites A Guino-O Uzzle
(74) *Attorney, Agent, or Firm* — Muncy, Geissler, Olds & Lowe, P.C.

(57) ABSTRACT

An anti-blast concrete and a method of fabricating an anti-blast structure member using such anti-blast concrete are disclosed. The composition of the anti-blast concrete according to the invention includes, in parts by weight, 1.0 part by weight of cement, 1.0 to 2.5 parts by weight of fine aggregates, 1.0 to 2.5 parts by weight of coarse aggregates, and a plurality of reinforcing fibers. The weight ratio of the reinforcing fibers to the cement ranges from 0.5% to 3%. The plurality of reinforcing fibers are a plurality of carbon fibers or a plurality of aramid fibers. A test body, made of the anti-blast concrete of the invention, has an average number of times of repeated impacts at an impact energy of 49.0 Joules equal to or larger than 41 times at 28 days of age.

7 Claims, 16 Drawing Sheets

(51) Int. Cl.
  *C04B 20/00* (2006.01)
  *C04B 40/00* (2006.01)
  *F42D 5/00* (2006.01)
  *C04B 28/02* (2006.01)
  *C04B 111/00* (2006.01)

(52) U.S. Cl.
  CPC .......... *C04B 28/02* (2013.01); *C04B 40/0042* (2013.01); *C04B 40/0046* (2013.01); *F42D 5/00* (2013.01); *C04B 2111/00974* (2013.01); *C04B 2201/52* (2013.01)

(58) Field of Classification Search
  CPC ................ C04B 2201/52; C04B 28/02; C04B 2111/00974; C04B 14/38; C04B 16/06; C04B 20/00; C04B 40/00; C04B 20/0048; F42D 5/00; F42D 5/045; F41H 5/24
  See application file for complete search history.

(56) References Cited

U.S. PATENT DOCUMENTS

2009/0162626 A1* 6/2009 Konishi .................... E04H 9/10
  428/212
2014/0060392 A1* 3/2014 Koenigstein ............ E04C 5/073
  106/802

* cited by examiner

ANTI-BLAST CONCRETE AND METHOD OF FABRICATING ANTI-BLAST STRUCTURE MEMBER USING SUCH ANTI-BLAST CONCRETE

CROSS-REFERENCE TO RELATED APPLICATION

This utility application claims priority to Taiwan Application Serial Number 109118452, filed Jun. 2, 2020, which is incorporated herein by reference.

BACKGROUND OF THE INVENTION

1. Field of the Invention

The invention relates to an anti-blast concrete and a method of fabricating an anti-blast structure member using such anti-blast concrete, and in particular, to an anti-blast concrete of which a test body is made and has the compressive strength and the number of times of repeated impacts more than those of a test body made of ordinary concrete, and to a method of fabricating an anti-blast structure member which, after the blast test, has the area and depth of crater occurred on the surface facing the blast and the area and depth of spalling occurred on the surface back to the blast less than those of an anti-blast structure member made of ordinary concrete.

2. Description of the Prior Art

In the petroleum, chemical, firecracker, and pyrotechnic industries, because there are many flammable and explosive production materials and products, the safety of surrounding equipment and workers must be protected during work, and the anti-blast structure member naturally becomes an indispensable protective barrier. However, the design and application of anti-blast structure members have always been a difficult subject in the above-mentioned high-risk industries. Due to the limited construction space of the industrial plant, it is impossible to design a very thick concrete structure member to resist the huge explosion shock wave, and it makes the strength of current anti-blast structure members difficult to meet the safety requirements. The use of steel anti-blast walls alone will significantly increase the construction cost, which is difficult for general enterprises to accept. Therefore, it is urgent to improve the anti-blast ability of concrete to manufacture safe and inexpensive anti-blast structure members.

In addition, the development of the Asia-Pacific situation in recent years shows that surrounding environment is not peaceful, and the international relationship of the surrounding contraries has become increasingly tense. However, the rapid development of science and technology, the accuracy and destructive capabilities of weapons have significantly improved, and the ability of weapons to comprehensively destroy early military facilities has been achieved. Therefore, it is urgent to develop novel concrete materials with good blast resistance and apply them to the rebuilding and new construction of military reinforced concrete structure members, so that our national defense can be equipped with a strong defense force.

There is still no prior art of anti-blast concrete which reveals its anti-blast ability and has been implemented in a commercial application. Especially, in the environment of the above-mentioned high-risk industries, once an explosion occurs, the explosion shock wave will impact the structure member one after another. The literature on how to evaluate the ability of the structure to withstand the explosion shock waves one after another is mostly related to national defense and military secrets, and it is still absent.

SUMMARY OF THE INVENTION

Accordingly, one scope of the invention is to provide an anti-blast concrete and a method of fabricating an anti-blast structure member using such anti-blast concrete.

The average number of times of the test body manufactured by using the anti-blast concrete according to the invention, which can withstand repeated impacts, represents the anti-explosion ability of the anti-blast concrete according to the invention. And, the results of blast test prove that the anti-blast concrete according to the invention has an excellent anti-blast ability. The test body of structure member, manufactured by the method according to the invention, it is also confirmed by the observation of the actual explosion test to prove the anti-blast ability of the anti-blast structure member fabricated by the method according to the invention.

An anti-blast concrete according to a preferred embodiment of the invention and the including parts weight are, 1.0 part by weight of cement; 1.0 to 2.5 parts by weight of fine aggregates; 1.0 to 2.5 parts by weight of coarse aggregates; and a plurality of reinforcing fibers. A weight ratio of the reinforcing fibers to the cement ranges from 0.5% to 3%. The plurality of reinforcing fibers are first dispersed, and then uniformly mixed into the cement by a dry and pre-mixing way. The plurality of reinforcing fibers are a plurality of carbon fibers or a plurality of aramid fibers. The reinforcing fibers have a length range of from 3 mm to 30 mm. The anti-blast concrete is made into a test body with a water-cement ratio, the test body has an average number of times of repeated impacts at an impact energy of 49.0 Joules equal to or larger than 41 times at 28 days of age. The water-cement ratio ranges from 0.4 to 0.6.

In one embodiment, the test body made by using the concrete according to the invention at 28 days of age has an average compressive strength equal to or larger than 33.55 MPa.

In one embodiment, when the test body made by using the concrete according to the invention including the reinforcing fibers having the length of 6 mm and with a weight ratio of the reinforcing fibers to the cement ranges of 0.1% at 28 days of age, the test body has the average number of times of repeated impacts at the impact energy of 49.0 Joules equal to 41 times. When the test body made by using the concrete according to the invention including the reinforcing fibers having the length of 12 mm and with a weight ratio of the reinforcing fibers to the cement ranges of 0.1% at 28 days of age, the test body has the average number of times of repeated impacts at the impact energy of 49.0 Joules equal to 146 times. When the test body made by using the concrete according to the invention including the reinforcing fibers having the length of 24 mm and with a weight ratio of the reinforcing fibers to the cement ranges of 0.1% at 28 days of age, the test body has the average number of times of repeated impacts at the impact energy of 49.0 Joules more than 2,000 times.

In one embodiment, the reinforcing fibers have an average diameter range of from 6 μm to 8 μm.

A method of fabricating an anti-blast structure member according to a preferred embodiment of the invention, firstly, is to prepare 1.0 part by weight of cement. Next, the method of the invention is to prepare 1.0 to 2.5 parts by weight of fine aggregates. Then, the method of the invention is to prepare 1.0 to 2.5 parts by weight of coarse aggregates. Subsequently, the method of the invention is to prepare a plurality of reinforcing fibers. The plurality of reinforcing fibers are a plurality of first carbon fibers or a plurality of first aramid fibers. The reinforcing fibers have a length range of from 3 mm to 30 mm. Afterward, the method of the invention is to place the plurality of reinforcing fibers in a high-temperature environment for a period of time to remove impurities on the surfaces of the plurality of reinforcing fibers. Next, the method of the invention is to, by an aerodynamic and sieving process, disperse the plurality of reinforcing fibers. Then, the method of the invention is to, by a dry and pre-mixing way, uniformly mix the dispersed reinforcing fibers into the cement. A weight ratio of the reinforcing fibers to the cement ranges from 0.5% to 3%. Subsequently, the method of the invention is to prepare a rebar frame. Afterward, the method of the invention is to, with a water-cement ratio, uniformly mix with fine aggregates, coarse aggregates, and the cement uniformly mixed with the reinforcing fibers into an anti-blast concrete. Finally, the method of the invention is to pour the anti-blast concrete into the rebar frame to finish the anti-blast structure member.

Further, the method of the invention is to prepare a reinforcing fabric, constituted by a plurality of second carbon fibers or a plurality of second aramid fibers. Moreover, the method of the invention is to attach the reinforcing fabric on a surface of the anti-blast structure member back to blast.

Distinguishable from the prior arts, the test body, fabricated by using the anti-blast concrete according to the invention, has an average number of times of repeated impacts at an impact energy of 49.0 Joules equal to or larger than 41 times at 28 days of age. It is evident that the anti-blast concrete according to the invention has excellent anti-blast ability. The test body of the structure member, fabricated by the method according to the invention, is confirmed by the observation of the actual explosion test that the anti-blast structure member fabricated by the method according to the invention also has an excellent anti-blast ability.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
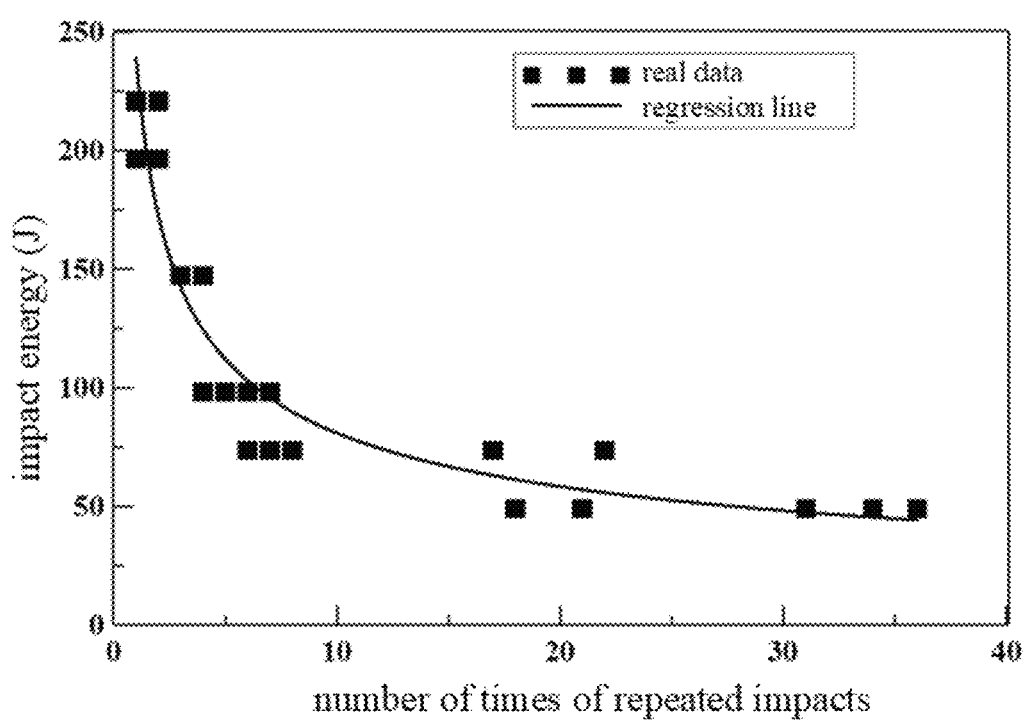
FIG. 1 is a diagram showing the relationship between the impact energy and the number of times of repeated impacts of the test body made by using the concrete without reinforcing fibers.

The composition of the anti-blast concrete according to the preferred embodiment of the invention and the including parts weight are, 1.0 part by weight of a cement; 1.0 to 2.5 parts by weight of fine aggregates; 1.0 to 2.5 parts by weight of coarse aggregates; and a plurality of reinforcing fibers.

In one embodiment, the cement used in the invention can be Portland cement, expandable cement, slag cement, and the like.

In one embodiment, the fine aggregates can be natural sands or artificial sands and has a particle size range of from 0.05 mm to 4 mm.

In one embodiment, the coarse aggregates can be natural sands or artificial sands and has a particle size range of from 4 mm to 30 mm.

The weight ratio of the reinforcing fibers to the cement ranges from 0.5% to 3%. The plurality of reinforcing fibers can be first dispersed, and then be uniformly mixed into the cement by a dry and pre-mixing way. The plurality of reinforcing fibers can be a plurality of carbon fibers or a plurality of aramid fibers.

In one embodiment, the reinforcing fibers used in the invention can be commercially available aramid fibers, for example, including Kevlar® fibers from DuPont, Twaron® fibers from Teijin Twaron, Technora® fibers also from Teijin Twaron, and other para-aramid fibers. Or for example, the commercially available aramid fibers include Nomex® fibers from DuPont, Basofil® fibers from Basofil Fibers, TeijinConex® fibers from Teijin Twaron, and other meta-aramid fibers.

In one embodiment, the reinforcing fibers have an average diameter range of from 6 μm to 8 μm. The reinforcing fibers have a length range of from 3 mm to 30 mm.

According to the CNS 1230 specification, some test bodies are poured by using the anti-blast concrete according to the invention and have a diameter of 100 mm×a height of 200 mm. These test bodies are subjected to a compressive strength test. The compressive strength test is performed according to the CNS 1232 test standard. The water-cement ratio available in the invention ranges from 0.4 to 0.6. In this example, the conditions for the preparation of these test bodies are the water to the cement ratio of 0.45, 1.05 parts by weight of the fine aggregates, 2.15 parts by weight of the coarse aggregates, the weight ratio of reinforcing fibers to the cement of 1%, and 28 days of age. These test bodies are mixed with carbon fibers with a length of 6 mm, carbon fibers with a length of 12 mm, and carbon fibers with a length of 24 mm respectively during manufacture. The average compressive strengths of these test bodies obtained by the compressive strength test are listed in Table 1. In contrast, the average compressive strengths of other test bodies without carbon fibers mixed during the manufacture are also listed in Table 1.

TABLE 1

| length of mixed carbon fibers | average compressive strength (MPa) |
| --- | --- |
| without reinforcing fibers mixed | 32.15 |
| 6 mm | 40.28 |
| 12 mm | 36.78 |
| 24 mm | 33.55 |

The test results listed in Table 1 confirm that the addition of reinforcing fibers can enhance the compressive strengths of the test bodies made by using the anti-blast concrete according to the invention. Compared with the test bodies made by using concrete without reinforcing fibers and the average compressive strength of the test bodies, it's made by using the anti-blast concrete according to the invention and being mixed with carbon fibers with the length of 6 mm, is increased by 8.13 MPa and the percentage increase is 25%. The test bodies made by using the anti-blast concrete according to the invention and being mixed with carbon fibers with the length of 6 mm have the best average compressive strength. Compared with the test bodies made by using concrete without reinforcing fibers, the average compressive strength of the test bodies, made by using the anti-blast concrete according to the invention and being mixed with carbon fibers with the length of 12 mm, is increased by 4.63 MPa and the percentage increase is 14%. Compared with the test bodies made by using concrete without reinforcing fibers, the average compressive strength of the test bodies, made by using the anti-blast concrete according to the invention and being mixed with carbon fibers with the length of 24 mm, is increased by 1.4 MPa and the percentage increase is 4.4%. Therefore, the compressive strengths of the test bodies made by using the anti-blast concrete according to the invention mixed with reinforcing fibers can be improved, and the improvement effect of the compressive strengths decreases as the length of the mixed reinforcing fibers increases.

In one embodiment, the test body made by using the concrete according to the invention at 28 days of age has an average compressive strength equal to or larger than 33.55 MPa.

Figure 2:
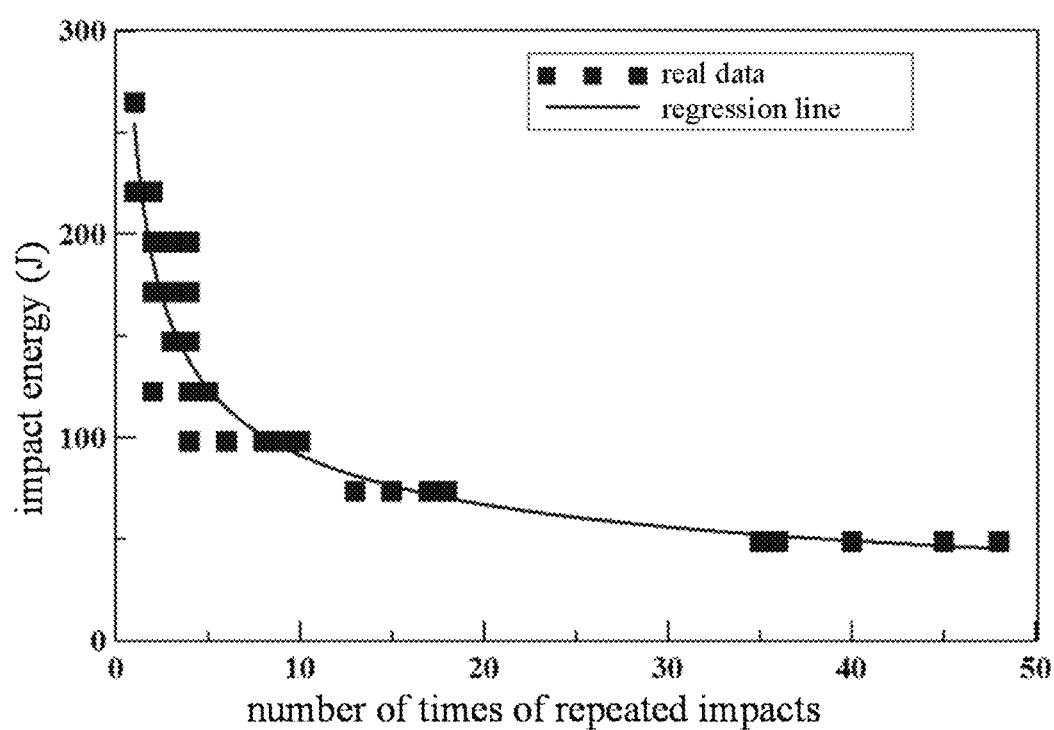
FIG. 2 is a diagram showing the relationship between the impact energy and the number of times of repeated impacts of the test body made by using the anti-blast concrete according to the invention mixed with carbon fibers having the length of 6 mm.
Figure 3:
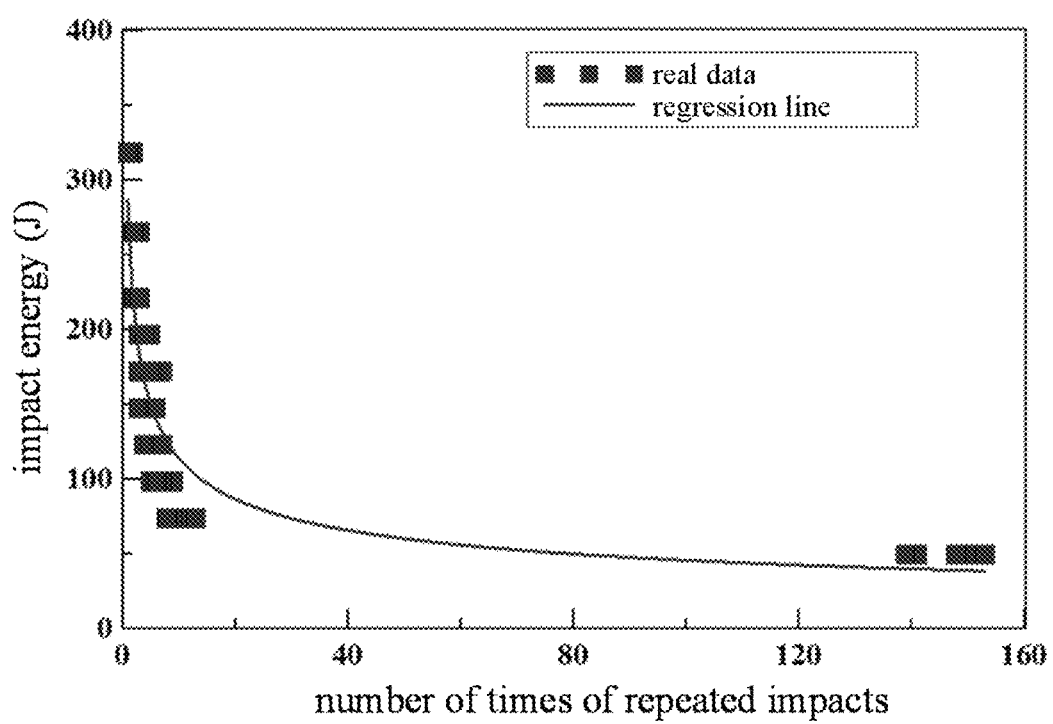
FIG. 3 is a diagram showing the relationship between the impact energy and the number of times of repeated impacts of the test body made by using the anti-blast concrete according to the invention mixed with carbon fibers having the length of 12 mm.
Figure 4:
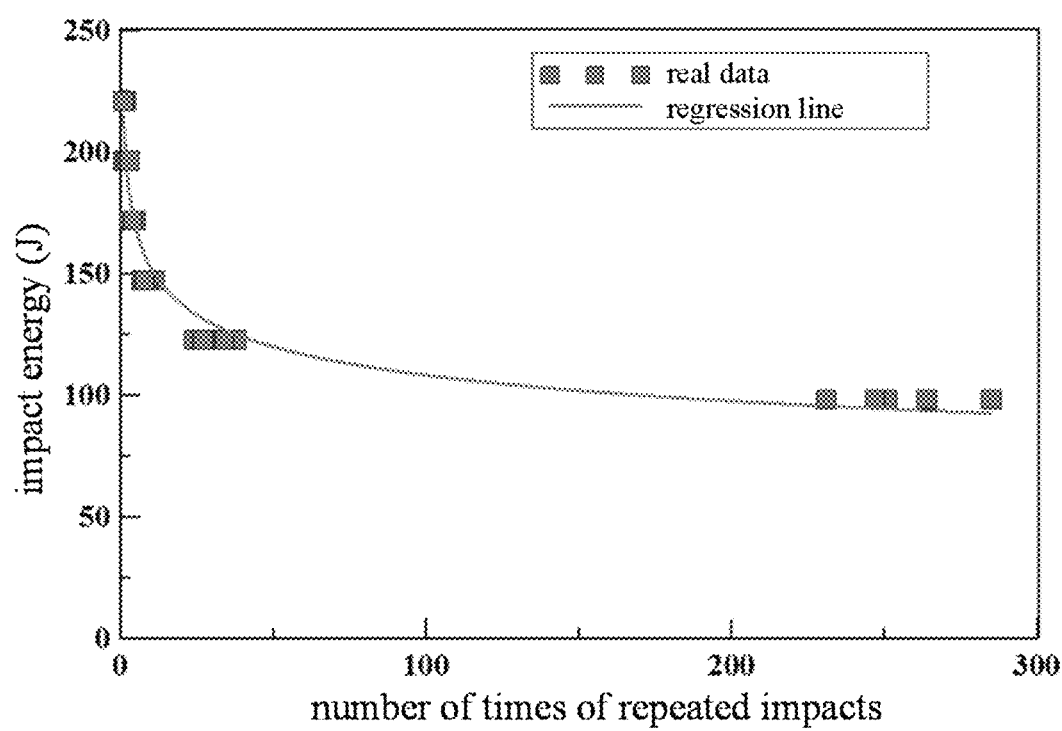
FIG. 4 is a diagram showing the relationship between the impact energy and the number of times of repeated impacts of the test body made by using the anti-blast concrete according to the invention mixed with carbon fibers having the length of 24 mm.

According to the ACI 544.2R-89 specification, some test bodies are poured by using the anti-blast concrete according to the invention and are subjected to an impact test. The water-cement ratio available in the invention ranges from 0.4 to 0.6. In this example, the conditions for the preparation of these test bodies are the water to the cement ratio of 0.45, 1.05 parts by weight of the fine aggregates, 2.15 parts by weight of the coarse aggregates, the weight ratio of reinforcing fibers to the cement of 1%, and 28 days of age. These test bodies are mixed with carbon fibers with a length of 6 mm, carbon fibers with a length of 12 mm, and carbon fibers with a length of 24 mm respectively during manufacture. In contrast, other test bodies without reinforcing fibers mixed during the manufacture are also subjected to the impact test. As mentioned above, in the environment of high-risk industries such as petroleum, chemical industry, firecrackers, and pyrotechnics, once an explosion occurs, the explosion shock wave will impact the structure member one after another. Therefore, under the impact of different impact energies, the number of times of repeated impacts for the test bodies are recorded until the test bodies are fractured. The relationship between the impact energy and the number of times of repeated impacts of the test body made by using the concrete without reinforcing fibers is shown in FIG. 1. The relationship between the impact energy and the number of times of repeated impacts of the test body made by using the anti-blast concrete according to the invention mixed with carbon fibers having the length of 6 mm is shown in FIG. 2. The relationship between the impact energy and the number of times of repeated impacts of the test body made by using the anti-blast concrete according to the invention mixed with carbon fibers having the length of 12 mm is shown in FIG. 3. The relationship between the impact energy and the number of times of repeated impacts of the test body made by using the anti-blast concrete according to the invention mixed with carbon fibers having the length of 24 mm is shown in FIG. 4.

As shown in FIG. 1, under repeated impacts with an impact energy of 49.0 Joules for the test body without reinforcing fibers, 36 times of repeated impacts are required to fracture the test body without reinforcing fibers.

As shown in FIG. 2, under repeated impacts with an impact energy of 49.0 Joules for the test body mixed with carbon fibers with a length of 6 mm, the number of times of repeated impacts to fracture the test body mixed with carbon fibers with the length of 6 mm is up to 41 times. The average number of times of repeated impacts that the test body can withstand the impact energy of 49.0 Joules is used as an index to evaluate the anti-blast ability of the test body. In the following paragraph, the average number of times of repeated impacts at the impact energy of 49.0 Joules for different test bodies will be aggregated and compared.

As shown in FIG. 3, under repeated impacts with an impact energy of 49.0 Joules for the test body mixed with carbon fibers with a length of 12 mm, the number of times of repeated impacts to fracture the test body mixed with carbon fibers with the length of 12 mm is up to 146 times.

As shown in FIG. 4, under repeated impacts with an impact energy of 49.0 Joules for the test body mixed with carbon fibers with a length of 24 mm, the number of times of repeated impacts to fracture the test body mixed with carbon fibers with the length of 24 mm is more than 2,000 times.

Under repeated impacts with an impact energy of 49.0 Joules, the average number of times of repeated impacts that all test bodies can withstand are listed in Table 2.

TABLE 2

| length of mixed carbon fibers | average number of times of repeated impact |
|---|---|
| without reinforcing fibers mixed | 36 |
| 6 mm | 41 |
| 12 mm | 146 |
| 24 mm | >2,000 |

The test results listed in Table 2 confirm that compared with the average number of times of repeated impacts of the test bodies without reinforcing fibers, the average numbers of times of repeated impacts of the test bodies with carbon fibers of 6 mm and 12 mm in length only slightly increased, the test bodies with carbon fibers of 24 mm in length can withstand repeated impacts more than 2,000 times.

Looking at various test data, and considering the actual explosion situation that the explosion shock wave impacts the structure member one after another, in the invention, the average number of times of repeated impacts that the test body can withstand the repeated impacts with the impact energy of 49.0 Joules is used as an index to evaluate the anti-blast ability of the test body.

Therefore, in one embodiment, the anti-blast concrete is made into a test body with a water-cement ratio, the test body has an average number of times of repeated impacts at an impact energy of 49.0 Joules equal to or larger than 41 times at 28 days of age. The water-cement ratio ranges from 0.4 to 0.6.

Figure 5:
FIG. 5 is a photomicrograph of the fractured surface of the test body made by using the anti-blast concrete according to the invention mixed with carbon fibers having the length of 6 mm after being fractured by an impact test with an optical microscope.
Figure 6:
FIG. 6 is a photomicrograph of the fractured surface of the test body made by using the anti-blast concrete according to the invention mixed with carbon fibers having the length of 12 mm after being fractured by an impact test with an optical microscope.
Figure 7:
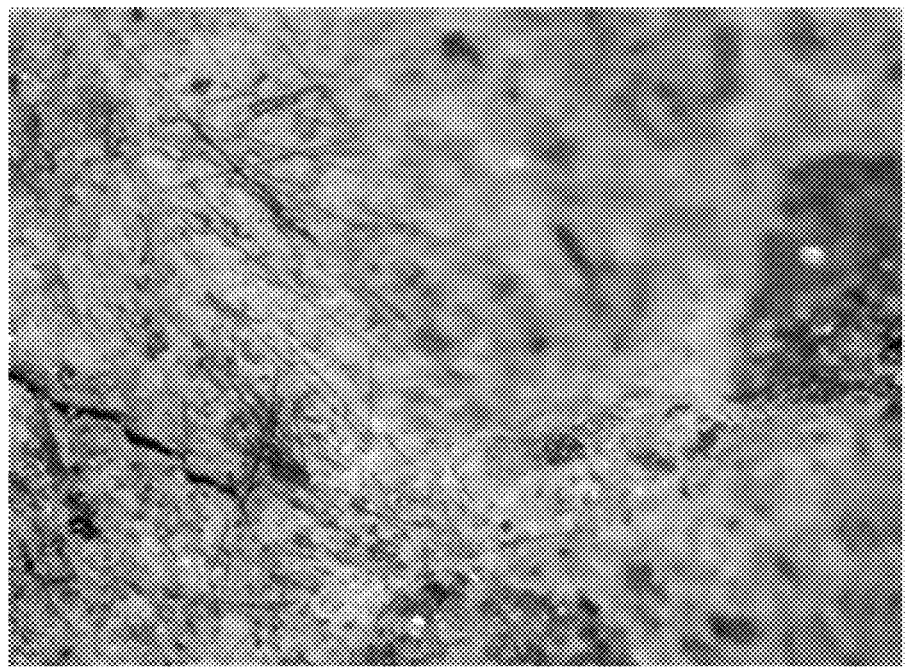
FIG. 7 is a photomicrograph of the fractured surface of the test body made by using the anti-blast concrete according to the invention mixed with carbon fibers having the length of 24 mm after being fractured by an impact test with an optical microscope.

Referring to FIG. 5, FIG. 6 and FIG. 7, FIG. 5 is a photomicrograph of the fractured surface of the test body made by using the anti-blast concrete according to the invention mixed with carbon fibers having the length of 6 mm after being fractured by an impact test with an optical microscope. FIG. 6 is a photomicrograph of the fractured surface of the test body made by using the anti-blast concrete according to the invention mixed with carbon fibers having the length of 12 mm after being fractured by an impact test with an optical microscope. FIG. 7 is a photomicrograph of the fractured surface of the test body made by using the anti-blast concrete according to the invention mixed with carbon fibers having the length of 24 mm after being fractured by an impact test with an optical microscope.

FIGS. 5, 6, and 7 show the failure modes of the test bodies to confirm that the failure mode of the test bodies with shorter carbon fibers is mostly slippage failure mode occurred between fibers and cementitious matrix, and the failure mode of the test bodies with longer carbon fibers is mostly fiber breakage failure mode.

The method of fabricating an anti-blast structure member according to the preferred embodiment of the invention, firstly, is to prepare 1.0 part by weight of cement. The applicable kinds of the cement used in the invention have been described in detail above and will be not described in detail herein.

Next, the method of the invention is to prepare 1.0 to 2.5 parts by weight of fine aggregates.

Then the method of invention is to prepare 1.0 to 2.5 parts by weight of coarse aggregates. The applicable kinds and particle sizes of the fine aggregate and the coarse aggregate have been described in detail above and will be not described in detail herein.

Subsequently, the method of the invention is to prepare a plurality of reinforcing fibers. The plurality of reinforcing fibers are a plurality of first carbon fibers or a plurality of first aramid fibers. The reinforcing fibers have a length range of from 3 mm to 30 mm. The applicable kinds of the first aramid fibers used in the invention have been described in detail above and will be not described in detail herein.

Afterward, the method of the invention is to place the plurality of reinforcing fibers in a high-temperature environment for a period of time to remove impurities on the surfaces of the plurality of reinforcing fibers. In one embodiment, the temperature of the high-temperature environment ranges from 450° C. to 550° C. The plurality of reinforcing fibers are placed in the high-temperature environment for more than 3 hours.

Next, the method of the invention is to, by an aerodynamic and sieving process, disperse the plurality of reinforcing fibers.

Then, the method of the invention is to, by a dry and pre-mixing way, uniformly mix the dispersed reinforcing fibers into the cement. A weight ratio of the reinforcing fibers to the cement ranges from 0.5% to 3%.

Subsequently, the method of the invention is to prepare a rebar frame.

Afterward, the method of the invention is to, with a water-cement ratio, uniformly mix with fine aggregates, coarse aggregates, and the cement uniformly mixed with the reinforcing fibers into an anti-blast concrete.

Finally, the method of the invention is to pour the anti-blast concrete into the rebar frame to finish the anti-blast structure member.

Further, the method of the invention is to prepare a reinforcing fabric, constituted by a plurality of second carbon fibers or a plurality of second aramid fibers. Moreover, the method of the invention is to attach the reinforcing fabric on a surface of the anti-blast structure member back to blast.

Figure 8:
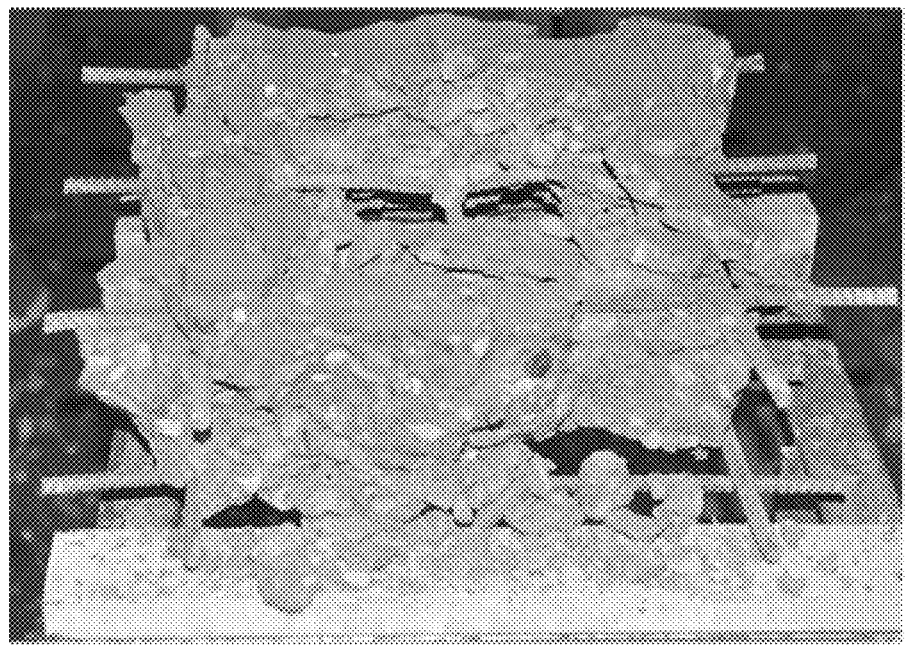
FIG. 8 is a photograph of the crushed appearance of the test body made by using the concrete without reinforcing fibers after the explosion test.
Figure 9:
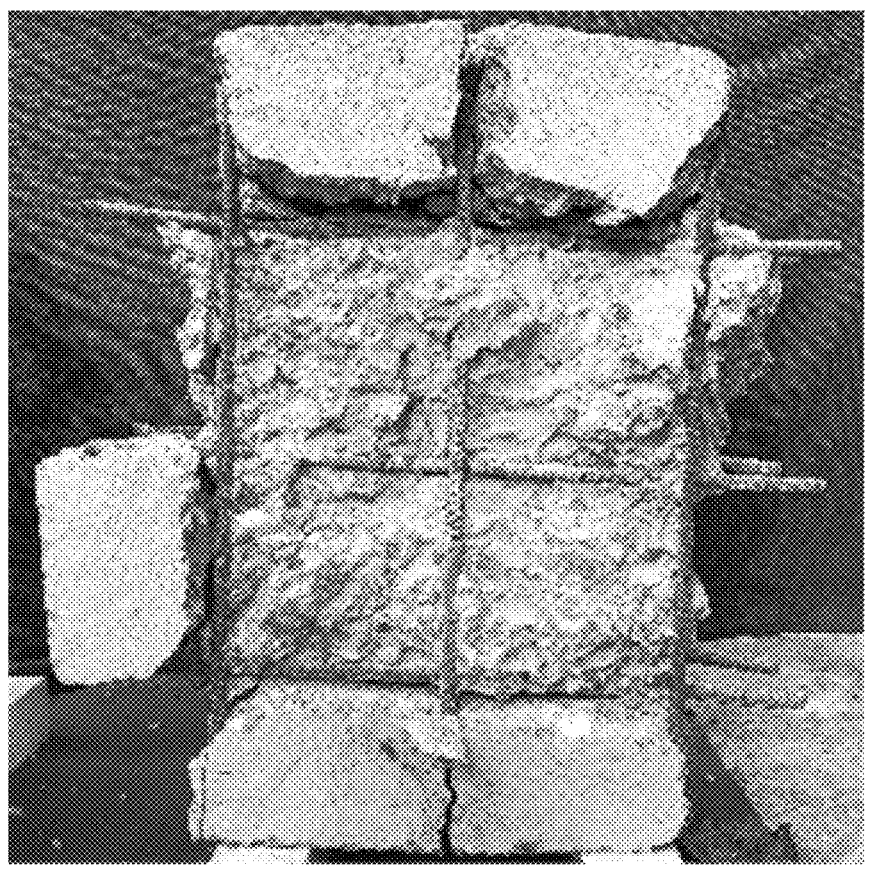
FIG. 9 is a photograph of the appearance of the surface facing the blast of a structure member fabricated by the method according to the invention mixed with carbon fibers having the length of 12 mm after an explosion test.
Figure 10:
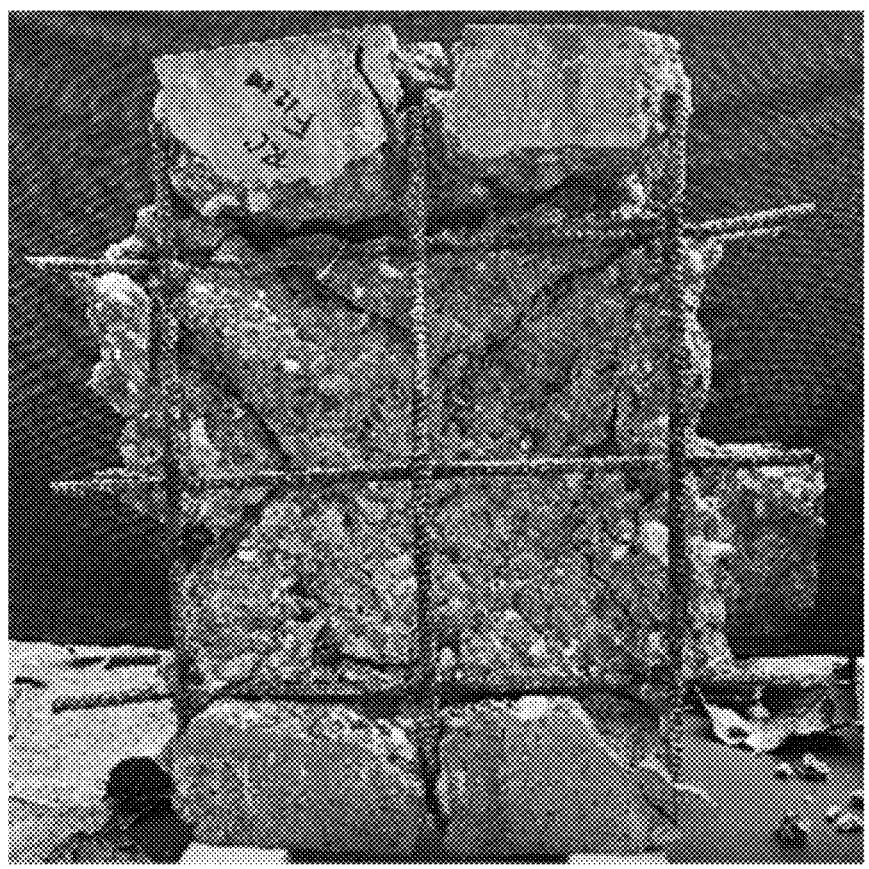
FIG. 10 is a photograph of the appearance of the surface back to the blast of the structure member fabricated by the method according to the invention mixed with carbon fibers having the length of 12 mm after the explosion test.
Figure 11:
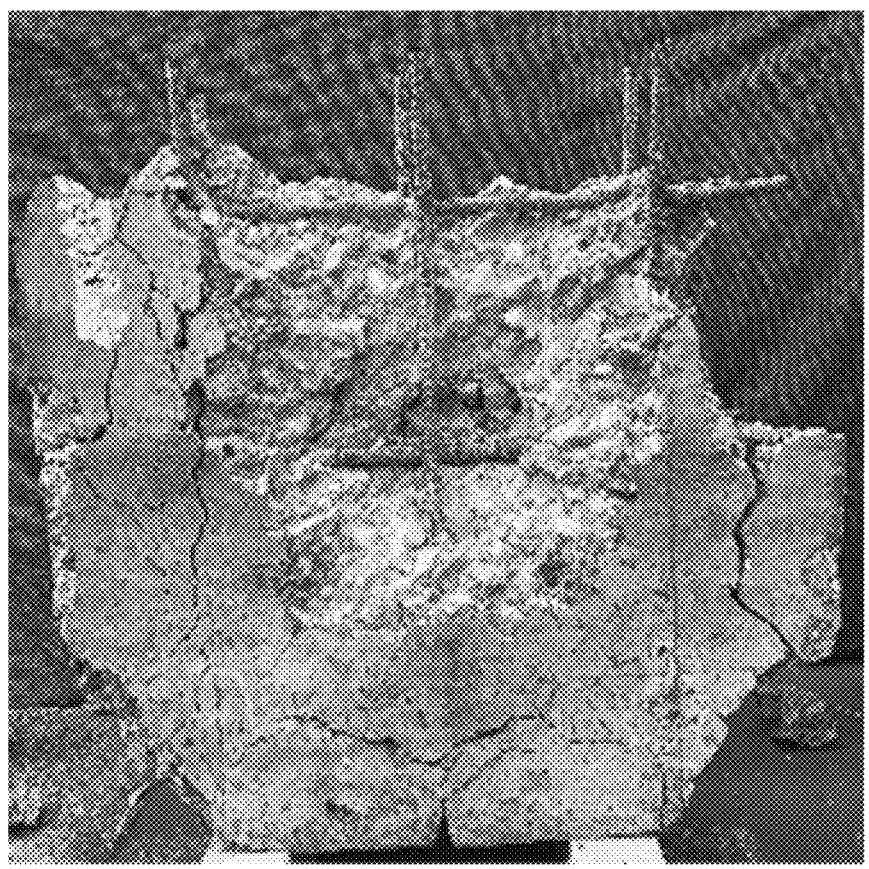
FIG. 11 is a photograph of the appearance of the surface facing the blast of a structure member fabricated by the method according to the invention mixed with carbon fibers having the length of 24 mm after an explosion test.
Figure 12:
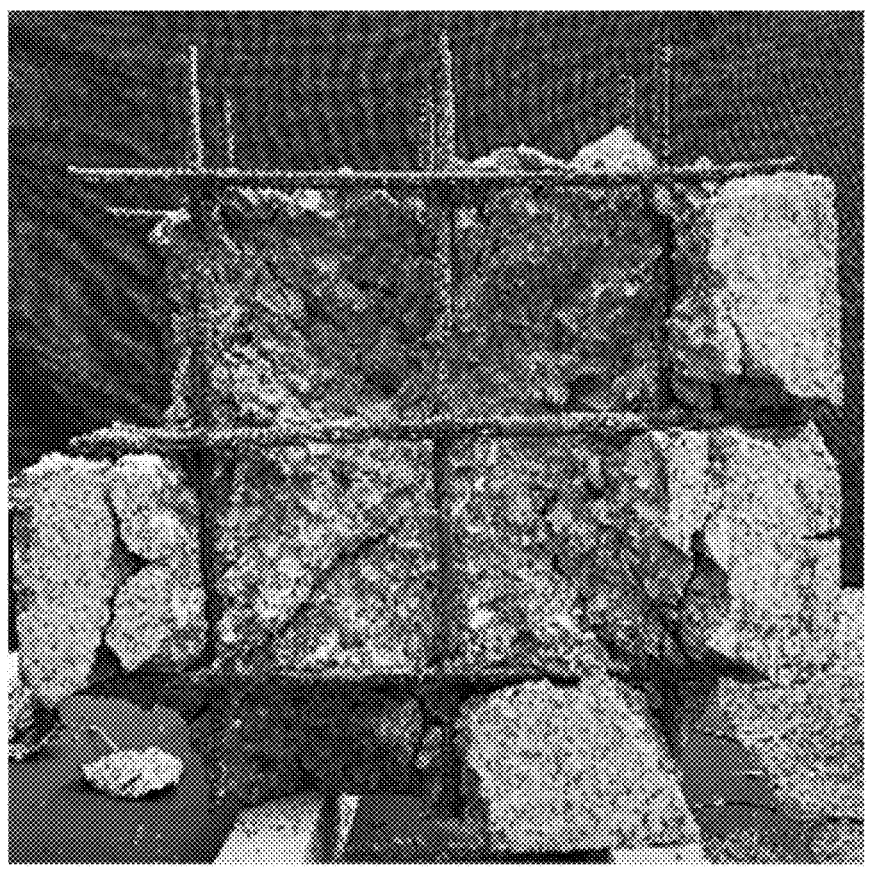
FIG. 12 is a photograph of the appearance of the surface back to the blast of the structure member fabricated by the method according to the invention mixed with carbon fibers having the length of 24 mm after the explosion test.
Figure 13:
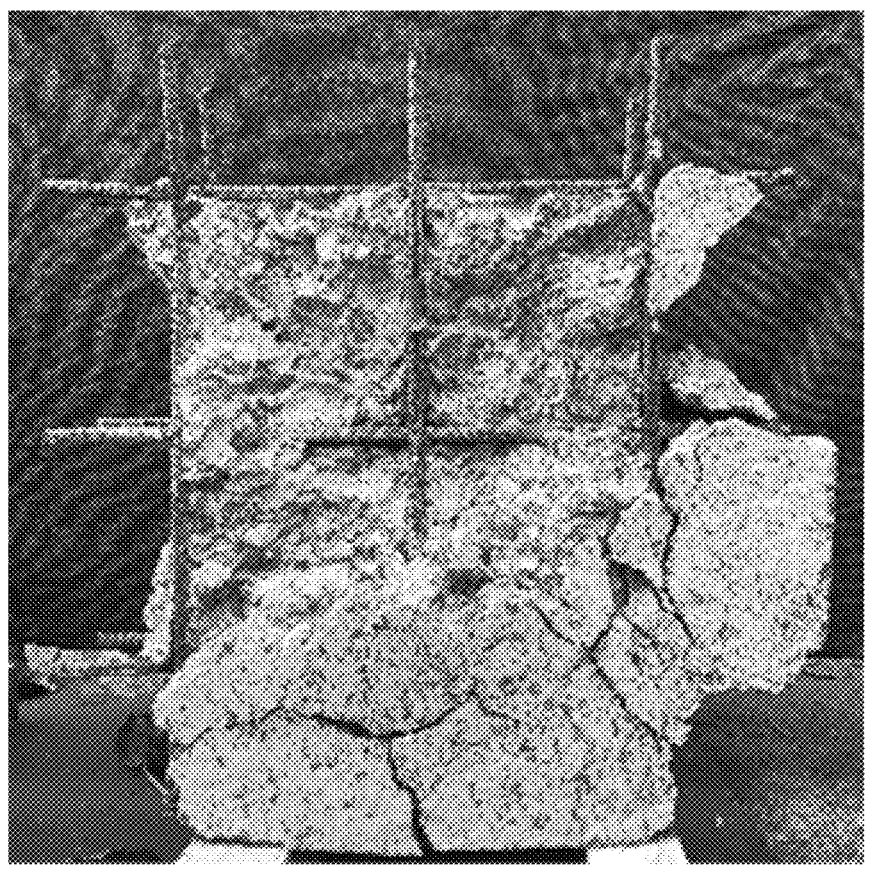
FIG. 13 is a photograph of the appearance of the surface facing the blast of a structure member fabricated by the method according to the invention mixed with carbon fibers having the length of 12 mm and 24 mm after an explosion test.
Figure 14:
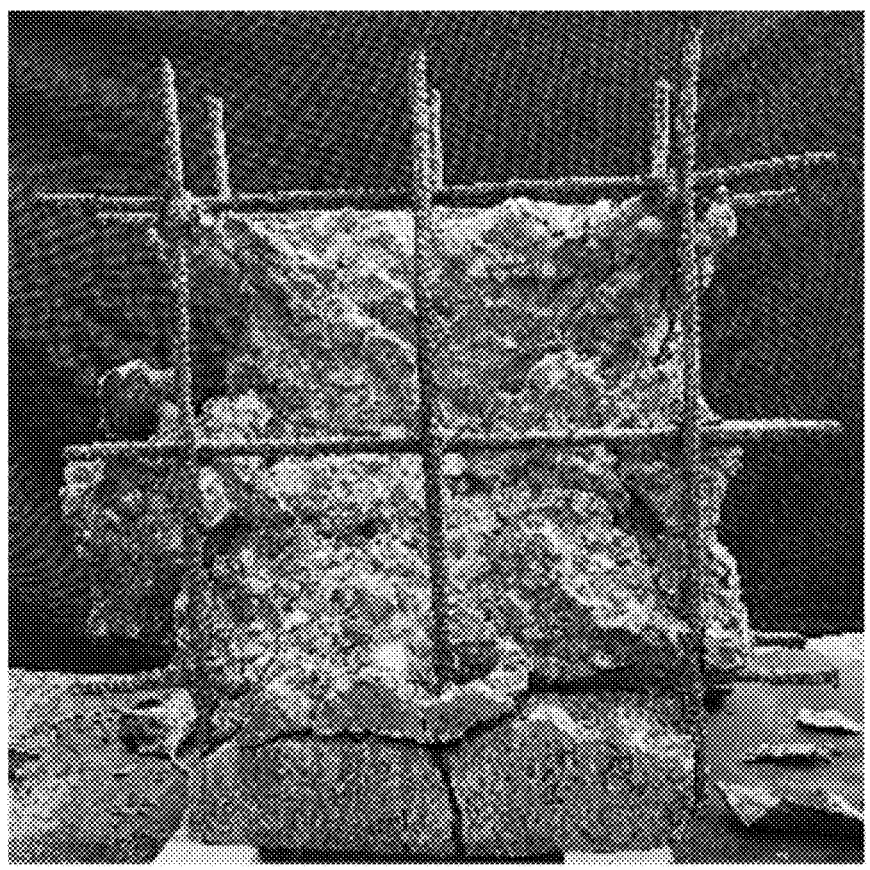
FIG. 14 is a photograph of the appearance of the surface back to the blast of the structure member fabricated by the method according to the invention mixed with carbon fibers having the length of 12 mm and 24 mm after the explosion test.
Figure 15:
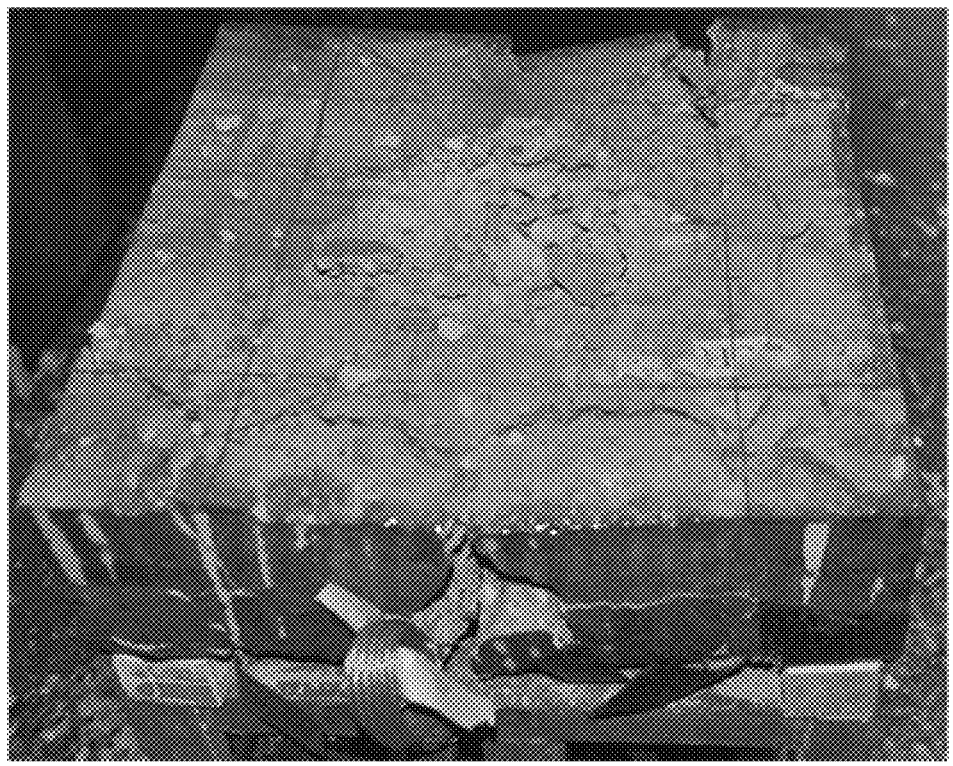
FIG. 15 is a photograph of the appearance of the surface facing the blast of a structure member fabricated by the method according to the invention mixed with carbon fibers having the length of 12 mm and 24 mm and including a reinforced fabric, constituted by a plurality of carbon fibers after an explosion test.
Figure 16:
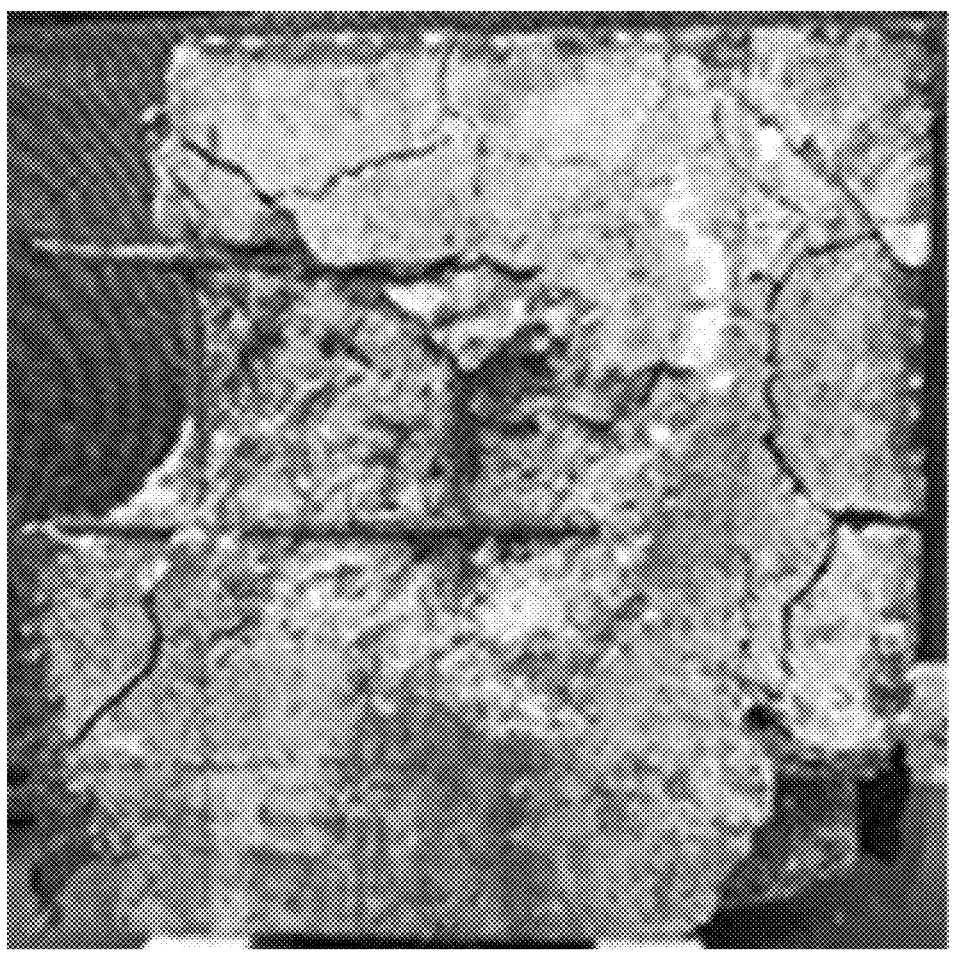
FIG. 16 is a photograph of the appearance of the surface back to the blast of the structure member fabricated by the method according to the invention mixed with carbon fibers having the length of 12 mm and 24 mm and including the reinforced fabric, constituted by the plurality of carbon fibers after the explosion test.

The test bodies of the structure members, fabricated by using the anti-blast concrete according to the invention, are subjected to an actual explosion test to observe the anti-blast abilities of the test bodies of the structure members. These test bodies of the structure members subjected to the actual explosion test are mixed with carbon fibers with a length of 6 mm, carbon fibers with a length of 12 mm, and carbon fibers with a length of 24 mm respectively during manufacture, a reinforcing fabric is attached on the surface of the test body of the structure member back to blast. In contrast, other test bodies of the structure members without reinforcing fibers mixed during the manufacture are also subjected to the actual explosion test. The explosion test is performed by placing 150 g of C4 explosive on the surfaces facing the explosion of the test bodies of the structure members. After the explosion test, observe the craters on the surfaces facing the blast of the test bodies of the structure members, the spallings on the surfaces back to blast of the test bodies of the structure members, or the breaches of the test bodies of the structure members. Moreover, the diameters and depths of the craters and spallings of the blasted test bodies of the structure members are measured for evaluating the anti-blast abilities of the structure members. The observation results of the explosion test are listed in Table 3. In Table 3, structure member A (as shown in FIG. 8) represents the structure member without reinforcing fibers. Structure member B1 (as shown in FIG. 9) represents the condition of craters on the surface facing the blast of the structure member mixed with carbon fibers with the length of 12 mm. Structure member B2 (as shown in FIG. 10) represents the condition of spallings on the surface back to the blast of the structure member mixed with carbon fibers with the length of 12 mm. Structure member C1 (as shown in FIG. 11) represents the condition of craters on the surface facing the blast of the structure member mixed with carbon fibers with the length of 24 mm. Structure member C2 (as shown in FIG. 12) represents the condition of spallings on the surface back to the blast of the structure member mixed with carbon fibers with the length of 24 mm. Structure member D1 (as shown in FIG. 13) represents the condition of craters on the surface facing the blast of the structure member mixed with carbon fibers with the length of 12 mm and 24 mm. Structure member D2 (as shown in FIG. 14) represents the condition of spallings on the surface back to the blast of the structure member mixed with carbon fibers with the length of 12 mm and 24 mm. Structure member E1 (as shown in FIG. 15) represents the condition of craters on the surface facing the blast of the structure member mixed with carbon fibers with the length of 12 mm and 24 mm and attached the reinforcing fabric on the surface back to the blast of the structure member. Structure member E2 (as shown in FIG. 16) represents the condition of spallings on the surface back to the blast of the structure member mixed with carbon fibers with the length of 12 mm and 24 mm and attached the reinforcing fabric on the surface back to the blast of the structure member. The weight ratio of reinforcing fibers to cement is 1%.

TABLE 3

| No. | fracture condition | shortest diameter (cm), longest diameter (cm) | depth (cm) |
| --- | --- | --- | --- |
| structure member A | crush | — | breach |
| structure member B1 | crater | 36, 50 | 3.5 |
| structure member B2 | spalling | 41, 50 | 8 |
| structure member C1 | crater | 31, 35 | 4 |
| structure member C2 | spalling | 32, 41 | 7.8 |
| structure member D1 | crater | 35, 42 | 3.5 |
| structure member D2 | spalling | 40, 50 | 6 |
| structure member E1 | crater | 23, 26 | 3 |
| structure member E2 | spalling | 32, 38 | 4.8 |

The results listed in Table 3 confirm that the surface facing the blast of the structure member without reinforced fibers is crushed and breached after the explosion test, and the anti-explosion ability the structure member without reinforced fibers is poor. The photograph of the crushed appearance of the test body made by using the concrete without reinforcing fibers after the explosion test is shown in FIG. 8. After the explosion test, an obvious crater occurs on the surface facing the blast of the structure member fabricated by the method according to the invention mixed with carbon fibers having the length of 12 mm, and the photograph of the appearance of the surface facing the blast of a structure member fabricated by the method according to the invention mixed with carbon fibers having the length of 12 mm is shown in FIG. 9. After the explosion test, obvious spalling occurs on the surface back to the blast of the structure member fabricated by the method according to the invention mixed with carbon fibers having the length of 12 mm, and the photograph of the appearance of the surface back to the blast of the structure member fabricated by the method according to the invention mixed with carbon fibers having the length of 12 mm is shown in FIG. 10. After the explosion test, an obvious crater occurs on the surface facing the blast of the structure member fabricated by the method according to the invention mixed with carbon fibers having the length of 24 mm, and the photograph of the appearance of the surface facing the blast of the structure member fabricated by the method according to the invention mixed with carbon fibers having the length of 24 mm is shown in FIG. 11. After the explosion test, obvious spalling occurs on the surface back to the blast of the structure member fabricated by the method according to the invention mixed with carbon fibers having the length of 24 mm, and the photograph of the appearance of the surface back to the blast of the structure member fabricated by the method according to the invention mixed with carbon fibers having the length of 24 mm is shown in FIG. 12. After the explosion test, an obvious crater occurs on the surface facing the blast of the structure member fabricated by the method according to the invention mixed with carbon fibers having the length of 12 mm and 24 mm, and the photograph of the appearance of the surface facing the blast of the structure member fabricated by the method according to the invention mixed with carbon fibers having the length of 12 mm and 24 mm is shown in FIG. 13. After the explosion test, obvious spalling occurs on the surface back to the blast of the structure member fabricated by the method according to the invention mixed with carbon fibers having the length of 12 mm and 24 mm, and the photograph of the appearance of the surface back to the blast of the structure member fabricated by the method according to the invention mixed with carbon fibers having the length of 12 mm and 24 mm is shown in FIG. 14. After the explosion test, a crater also occurs on the surface facing the blast of the structure member fabricated by the method according to the invention mixed with carbon fibers having the length of 12 mm and 24 mm and attached the reinforcing fabric on the surface back to the blast of the structure member, but compared with other structure members, the range of crater, occurring on the surface facing the blast of the structure member fabricated by the method according to the invention mixed with carbon fibers having the length of 12 mm and 24 mm and attached the reinforcing fabric on the surface back to the blast of the structure member, is obviously reduced. After the explosion test, the photograph of the appearance of the surface facing the blast of the structure member fabricated by the method according to the invention mixed with carbon fibers having the length of 12 mm and 24 mm and attached the reinforcing fabric on the surface back to the blast of the structure member is shown in FIG. 15. After the explosion test, obvious spalling occurs on the surface back to the blast of the structure member fabricated by the method according to the invention mixed with carbon fibers having the length of 12 mm and 24 mm and attached the reinforcing fabric on the surface back to the blast of the structure member, and the photograph of the appearance of the surface back to the blast of the structure member, fabricated by the method according to the invention mixed with carbon fibers having the length of 12 mm and 24 mm and attached the reinforcing fabric on the surface back to the blast of the structure member, is shown in FIG. 16.

With detailed description of the invention above, it is clear that the test body, fabricated by using the anti-blast concrete according to the invention, has an average number of times of repeated impacts at an impact energy of 49.0 Joules equal to or larger than 41 times at 28 days of age. It is evident that the anti-blast concrete according to the invention has an excellent anti-blast ability. The test body of structure member, fabricated by the method according to the invention, is confirmed by the observation of the actual explosion test that the anti-blast structure member fabricated by the method according to the invention also has an excellent anti-blast ability.

With the embodiment and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An anti-blast concrete, in parts by weight, comprising:
   1.0 part by weight of a cement;
   1.0 to 2.5 parts by weight of fine aggregates;
   1.0 to 2.5 parts by weight of coarse aggregates; and
   a plurality of reinforcing fibers, wherein a weight ratio of the reinforcing fibers to the cement ranges from 0.5% to 3%, the plurality of reinforcing fibers are first dispersed, and then uniformly mixed into the cement by a dry and pre-mixing way, the plurality of reinforcing fibers are a plurality of carbon fibers or a plurality of aramid fibers, the reinforcing fibers have a length range of from 3 mm to 30 mm;
   wherein when said anti-blast concrete is made into a test body with a water-cement ratio, the test body has an average number of times of repeated impacts at an impact energy of 49.0 Joules equal to or larger than 41 times at 28 days of age, and the water-cement ratio ranges from 0.4 to 0.6.

2. The anti-blast concrete of claim 1, wherein the test body has an average compressive strength equal to or larger than 33.55 MPa at 28 days of age.

3. The anti-blast concrete of claim 2, wherein when the test body comprises the reinforcing fibers having the length of 6 mm, the test body has the average number of times of repeated impacts at the impact energy of 49.0 Joules equal to 41 times, when the test body comprises the reinforcing fibers having the length of 12 mm, the test body has the average number of times of repeated impacts at the impact energy of 49.0 Joules equal to 146 times, when the test body comprises the reinforcing fibers having the length of 24 mm, the test body has the average number of times of repeated impacts at the impact energy of 49.0 Joules more than 2,000 times.

4. The anti-blast concrete of claim 3, wherein the reinforcing fibers have an average diameter range of from 6 μm to 8 μm.

5. The anti-blast concrete of claim 1, wherein when the test body comprises reinforcing fibers having a length of 6 mm, 12 mm, or 24 mm.

6. The anti-blast concrete of claim 1, wherein when the test body comprises reinforcing fibers having a length of 24 mm.

7. An anti-blast concrete, in parts by weight, consisting of:
   1.0 part by weight of a cement;
   1.0 to 2.5 parts by weight of fine aggregates;
   1.0 to 2.5 parts by weight of coarse aggregates;
   a plurality of reinforcing fibers, wherein a weight ratio of the reinforcing fibers to the cement ranges from 0.5% to 3%, the plurality of reinforcing fibers are first dispersed, and then uniformly mixed into the cement by a dry and pre-mixing way, the plurality of reinforcing fibers are a plurality of carbon fibers or a plurality of aramid fibers, the reinforcing fibers have a length range of from 3 mm to 30 mm; and
   water, wherein the water-cement ratio ranges from 0.4 to 0.6,
   wherein when said anti-blast concrete is made into a test body with a water-cement ratio, the test body has an average number of times of repeated impacts at an impact energy of 49.0 Joules equal to or larger than 41 times at 28 days of age.

* * * * *